Aug. 9, 1932.  F. B. COLEY  1,870,442
APPLICATION OF LIQUID TO FILTER CAKES
Filed Sept. 10, 1929  2 Sheets-Sheet 1
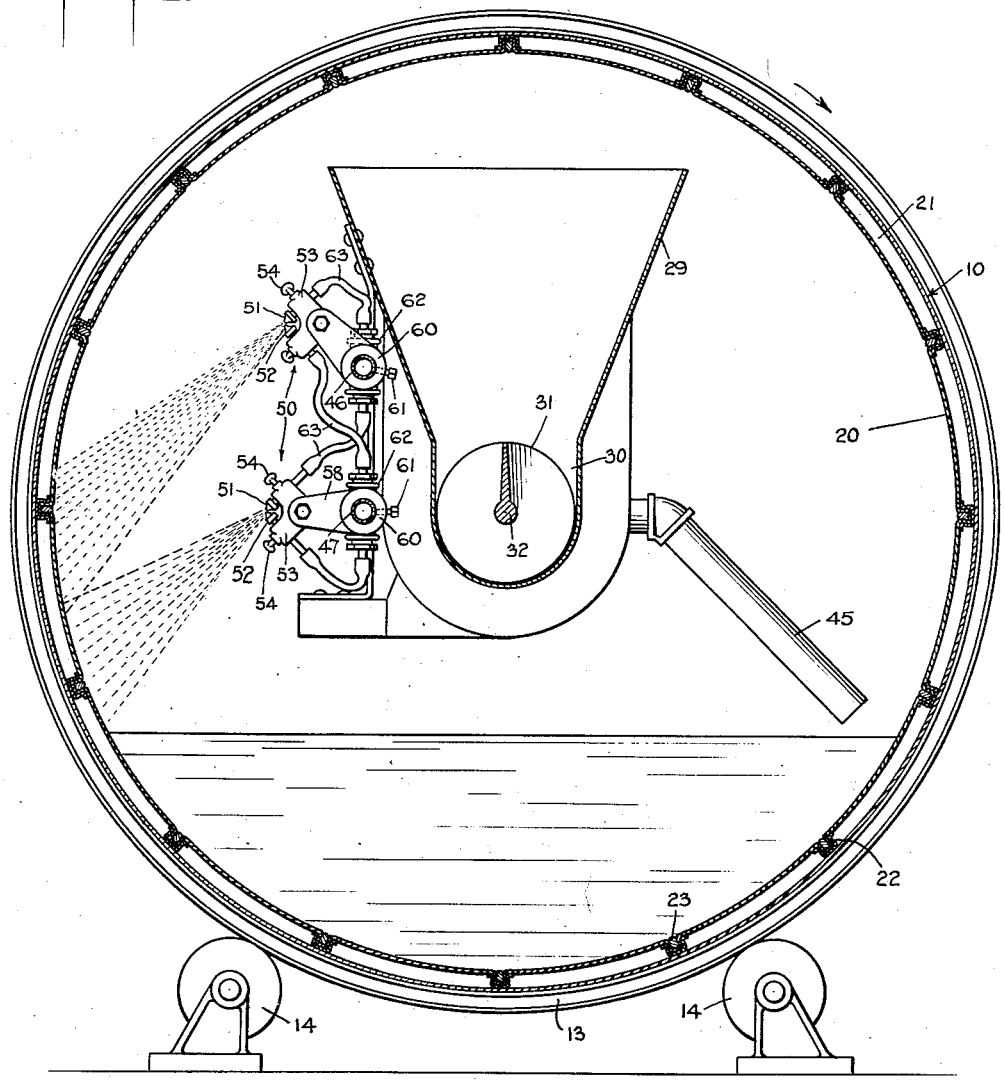
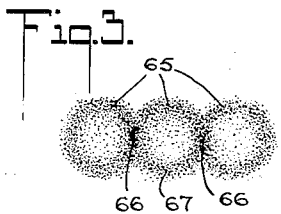
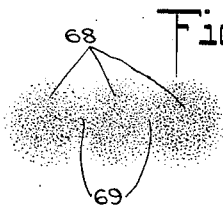
INVENTOR
FRANCIS. B. COLEY
BY
HIS ATTORNEY Aug. 9, 1932.  F. B. COLEY  1,870,442
APPLICATION OF LIQUID TO FILTER CAKES
Filed Sept. 10, 1929  2 Sheets-Sheet 2

INVENTOR
FRANCIS B. COLEY
BY
HIS ATTORNEY

Patented Aug. 9, 1932

1,870,442

UNITED STATES PATENT OFFICE

FRANCIS B. COLEY, OF WESTPORT, CONNECTICUT, ASSIGNOR, BY MESNE ASSIGNMENTS, TO THE DORR COMPANY, INC., OF NEW YORK, N. Y., A CORPORATION OF DELAWARE

APPLICATION OF LIQUID TO FILTER CAKES

Application filed September 10, 1929. Serial No. 391,633.

This invention relates to improvements in the application of relatively small quantities of liquid to filter cakes, and is particularly directed to an arrangement suitable for applying wash water or other liquid to such cakes during the normal operation of standard types of filter, especially the continuous rotary types.

In the operation of a rotary drum filter, such as heretofore in use, the filtrate in the pulp is passed through a filter medium in the filtering zone and is drawn off. The solids separated from the filtrate collect on the filter medium and in the rotation of the drum form a continuous layer or cake passing out of the filtering zone. The material in the cake still contains a substantial amount of filtrate which it may be desirable to remove. For this purpose wash water, or other liquid, is sprayed on the cake as it passes through a washing zone, and as a wash filtrate is drawn off through the cake. The cake may then, if desired, be dried in a drying zone as by sucking air therethrough and is stripped from the filter material to render it again suitable for use in the filtering zone.

The cake as it rises from the filtering zone is relatively soft and loose, as it consists simply of particles held together by adhesion which in many cases is relatively slight, so that the cake is quite delicate and is readily broken. Furthermore, as drying progresses there is a tendency with most materials for the cake to shrink and crack as it becomes drier.

It is a desideratum, however, in order to obtain the best results, both in the washing and drying operations, to prevent, as far as possible, the formation of any substantial holes or cracks in the cake either from drying or from injury to the soft cake; inasmuch as, if such holes or cracks exist in the portion of the cake in the washing zone, the water will be drawn through such parts of the cake and the rest of the cake will not be acted on to any substantial extent, and, if this condition exists in the drying zone, the drying action will be injuriously affected in the same general way.

Holes or cracks may be caused by the manner in which the wash water is applied to the cake. For example, the impact of the water against the cake should not be too heavy. This is true even in the event that the distribution of wash water on the cake is fairly uniform, but trouble is more easily avoided under such circumstances in that the pressure or flow can readily be reduced as required. If, however, the distribution is uneven there is much greater difficulty in that, in supplying a suitable or minimum amount to one area, the supply to another area may be excessive and sufficiently so to cause damage to the cake. Even in the event that there is no breakage due to uneven wetting of the cake there may be a lack of uniformity in the washing and a lack of uniformity in the drying.

In order to obtain distribution of sufficient uniformity and to avoid the formation of drops and injury to the cake by the impact of the drops thereagainst, the spray should be made as fine as possible and the spraying apparatus should be such as to conduce to the desired uniformity of distribution.

Heretofore the spray of washing water has been supplied for each rotary filter by means of one or more flat nozzles or one or more round nozzles, the number of nozzles being determined in each case by the length of the filter.

When flat nozzles are used there is a tendency to insufficient breaking up of the water into spray and to too heavy impact of the water against the cake. In order to obtain a good spray the velocity of the water leaving a nozzle of this type is such as to cause too heavy impact on the cake, and, if the velocity is reduced, the water is not sufficiently broken up into spray and there is a tendency to form drops with consequent liability of damage to the cake. Nozzles of the round type are more satisfactory in these respects than those of the flat type; but the water emerges from each of them in a cone in which the liquid is evenly distributed and, where use is made of a plurality of such nozzles in alignment, these cones overlap and give rise to further problems relative to uniformity of distribution. Another difficulty with the round type of nozzle is that where the amount of water to be supplied is small, each nozzle must be so small that there is danger of the clogging of such nozzles by particles of material in the wash water.

The main object of the present invention is to provide an arrangement adapted to supply as small amount of liquid to the surface of the cake as may be desired, with much greater uniformity than has heretofore been possible with small amounts of liquid such as wash water, and without marring delicate cakes by dripping or impact due to uneven distribution of the liquid. This object in general is accomplished by adapting an atomizer type of spray for such use, thereby accomplishing the further object of eliminating difficulties from clogging fine nozzles, since this type of spray permits the use of relatively large and open nozzles for supplying the liquid.

Further objects and advantages of the invention will be apparent upon consideration of the following description and the accompanying drawings, in which—

Fig. 1 is a vertical transverse sectional view on the line 1—1 of Fig. 2 of a rotary filter embodying the present invention;

Fig. 3 is a view illustrating the distribution of water from a plurality of round nozzles; and Fig. 4 is a view similar to Fig. 3 illustrating the distribution of water from a plurality of atomizer units.

Figure 2:
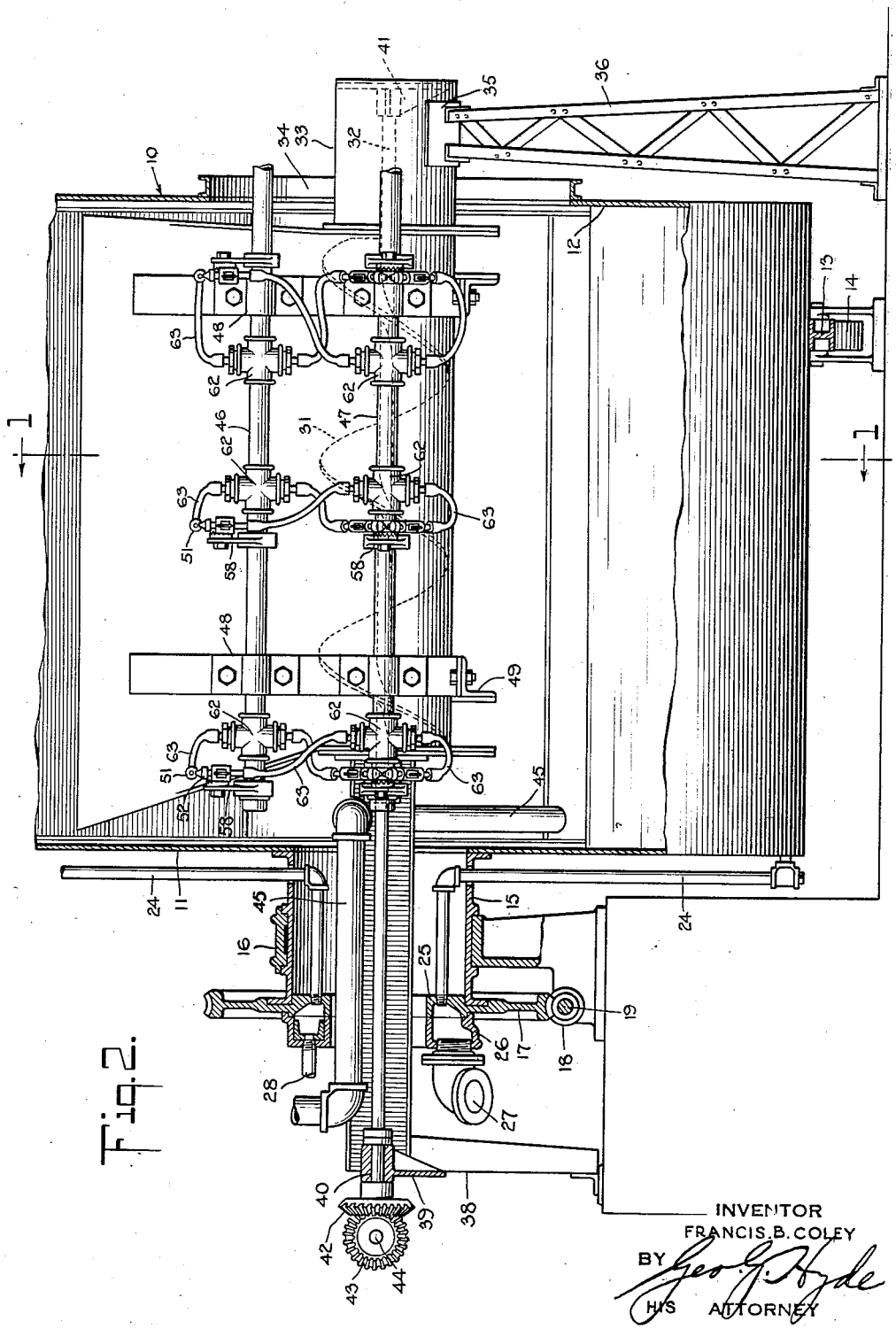
Fig. 2 is a view showing the interior mechanism in side elevation and other parts in longitudinal vertical section.

The pneumatic atomizing means for supplying wash water to the cake in a washing zone is here illustrated in connection with a rotary internal drum filter of the Dorr type. In general such atomizing means may include atomizer units, each having a water nozzle and an air nozzle to direct air across the outlet of the water nozzle which is of sufficient cross section to prevent clogging. The nozzles of each of the atomizer units are adjustably held in a common support which may be adjusted to direct the spray upwardly or downwardly and also to vary the position of the atomizer unit as a whole. Water and air are supplied to the atomizer units by supply pipes or lines entering the drum from one end and which may be used to support the atomizer units. In the illustrated form of the invention the atomizer units are mounted for rotation about an axis parallel to the axis of the drum on brackets mounted on said supply liner and adjustable along and around said pipes. To permit adjustment of the atomizer units to different positions and the relative adjustment of the nozzles in each unit, air and water are supplied to the corresponding nozzles by flexible connections such as flexible tubes.

Referring to the drawings, 10 designates a drum or shell having ends 11 and 12 and which may be supported for rotation by suitable means such as a riding ring 13 adjacent the end 12 of the drum and resting on suitable positioned rollers 14, and a hollow trunnion 15 projecting from the other end 11 of the drum and journaled in a bearing 16. Rotation of the drum may be effected by means of a worm wheel 17 fixed on the trunnion 15 at its outer end and meshing with a worm 18 on a driving shaft 19.

The drum is provided at its interior with filter material 20 which extends completely around the drum and from end to end therof and is arranged to provide panels or cells 21 which are sealed from each other to prevent the passage of liquid directly from cell to cell. The filter material usually consists of a filter medium which may be cloth of suitable backing material to hold the filter medium against pressure due to suction exerted in the various cells 21. Herein the filter material as a whole is designated by 20 and the panels are formed by channels 22 extending longitudinally of the drum and seamed thereto at the inner surface thereof and arranged at suitable intervals around the drum, the filter 20 being pressed down into said channels 22 and held in position by member 23.

To provide suction therein each of said cells is connected at the end 11 of the drum with a suction line 24 extending into the trunnion 15 and connected with a suitable movable valve or ring 25, which is here shown as formed integral with worm wheel 17 and may be of any suitable form now in use. The movable valve ring 25 cooperated with a suitable stationary valve plate or ring 26 connected at the lower part thereof with a main suction line 27 and at its upper part with a pressure line 28 so that when each cell 21 rises substantially to the top of the drum pressure will be applied to remove cake from the filter material and cause it to drop into a suitable hopper 29 extending longitudinally of the drum at the inside thereof.

The hopper 29 is provided at its bottom with a suitable trough 30 in which is positioned a conveying device, such as actuated by a shaft 32. Adjacent to the end 12 of the drum the hopper 29 is connected with a tubular member 33 coaxial with the shaft 32 and extending through an opening 34 in said end 12 of the drum. This tubular member 33 rests on a member or bearing 35 at the top of a standard or support 36, thus supporting the hopper 29 at one end. Support for the hopper at its other end is provided by two members 37 attached to said other end of the hopper and extending outwardly through a central opening in the end 11 of the drum and through the trunnion 15 on opposite sides of the shaft 32 of the screw conveyor. At their outer ends the members 37 are supported by posts 38 and are connected by a cross member 39 on which is provided a bearing 40 for the shaft 32. At the other end of the drum the shaft 32 is journaled in a spider 41 mounted in the outer end of the tubular member 33. Adjacent to the bearing 40, the shaft 32 is provided with a bevel gear 42 which meshes with a bevel gear 43 on a driving shaft 44.

Pulp is supplied to the interior of the drum by means of a supply pipe 45 passing inwardly between the members 37 and then downwardly, as indicated in Fig. 1 to direct the pulp to the screen at its downwardly moving side substantially at the level at which the pulp is maintained in the filter. As indicated by the arrow in Fig. 1 the drum rotates in a clockwise direction. The pulp is maintained at the desired level by proper correlation between the feed of the pulp and the withdrawal of the filtrate by suction. If, however, the pulp rises to the level of the lower part of the opening 34 it will overflow therethrough.

To supply air and water for washing the cake according to the present invention, there are provided an air line 46 and a water line 47 projecting into the drum 34 in the end 12. The air line is arranged above the water pipe and these lines or pipes are supported by means of strap brackets 48 connected at their upper ends with the wall of the hopper 29 at the side where the washing is effected and at their lower ends with brackets 49 attached to the hopper at its bottom. Preferably there is an even number of atomizer units 50, half of them being mounted on the air line 46 and the other half on the water line 47 and they are arranged in pairs substantially in vertical planes. Each of these units includes an air nozzle 51 and a water nozzle 52 slidably mounted in arms of a support or block 53 so that air from the air nozzle will blow across the end of the water nozzle and drive water flowing therefrom in atomized condition against the cake as it passes through the washing zone. Both nozzles are held in position by set screws 54 and may be adjusted so as to be in any desired relation with respect to each other. The heads of the nozzles are preferably separate from the bodies and are larger than the bodies so that fine openings can be provided without weakening the tip ends. Such beads are also tapered at their outlet ends so that such ends may be brought close together.

Each block is provided at one side with teeth arranged in a circle and adapted to cooperate with teeth correspondingly arranged on a boss at one side of a bracket 58, and after adjusting the block on the bracket, these two parts are pressed together to bring the two sets of teeth into cooperative relation by suitable devices 59, such as bolts or screws. Each bracket 58 is also provided with ring 60 fitting around the corresponding pipe, 46 or 47 so that the bracket may be adjusted around and along the pipe and be secured in any desired position by means of a set screw 61.

For the purpose of supplying water and air to each of the atomizer units each of the lines 46 and 47 may be provided with cross take-offs 62, each of these take-offs on the line 46 being connected by a flexible connection with such hose 63 with an air nozzle of one of the upper units and an air nozzle of one of the lower units and each take-off on the line being connected in the same general manner with a water nozzle of one of the upper units and with a water nozzle of one of the lower units.

It will be evident that the various parts of the atomizing means may be adjusted to meet substantially any requirements which would arise in practice.

The distribution of water from a plurality of circular nozzles is illustrated in Fig. 3 in which 65 indicates each of the substantially circular areas (corresponding in each case to a cross section of one of the conical sprays) receiving water from a single spray nozzle. In order to supply a suitable amount of wash water to parts of the cake between the central parts of two adjacent sprays, the spray areas should overlap in a zone 66 to enable the increased concentration of water from the two sprays to compensate for the short length of said zone 66, in the direction of travel of the cake, as compared with the length of corresponding zones nearer the centers of such areas 65. If the distribution of water throughout each circular area were uniform, the amount of overlap could be determined with considerable accuracy. However, it has been found that the water is more concentrated near the conical surface of the spray and consequently in an annular zone 67. For this reason it is difficult to obtain, with round nozzles, the desired degree of uniformity under all conditions met in use.

As illustrated in Fig. 4, the distribution throughout the spray from an atomizer unit of the present invention is substantially uniform. Consequently the circular spray areas 68, Fig. 4, may be overlapped in zones 69 so as to produce substantially uniform distribution of water on the cake in the washing zone, suitable allowance being made for the relatively short lengths of such zones as compared with the diameters of the spray areas 68.

When the filter is in use, pulp is supplied through the supply pipe or launder 45 to the interior of the drum 10 at such a rate as to replace the amount of filtrate through the filter medium and the amount of solids removed in the form of cake, and maintain the pulp in the drum at substantially the same level at all times. As each panel or cell of the filter material passes beneath or through the pulp in the drum and suction is exerted at this point through a suction line 24 connected with such cell, filtrate is drawn through the corresponding part of the filter medium or material and solids in the form of cake are accumulated on the filter material. When the cell passes above the pulp level and from the filtering zone, the cake on the corresponding portion of filtering material may still contain a considerable quantity of the original liquid. To recover such liquid the cake is sprayed with water from the atomizer units and this water with such residual liquid is drawn off through the filtering medium by suction.

Later, either with or without drying in a drying zone, the cake is carried to the top of the drum and is there acted upon by compressed air from the pressure line to separate it from the filter material and cause it to drop into the hopper 29 from which it is removed by means of the conveyor screw 31 and discharged from the outer end of the tubular member 33.

It should be understood that various changes may be made in the construction and arrangement of parts without departing from the true spirit and scope of the invention.

I claim:

Mechanism adapted for use in a rotary filter having a rotary drum provided with a filter medium adjacent the inner surface of the periphery of the drum and on which cake is formed in a filtering zone and washed in a washing zone; comprising means for harmlessly washing said cake in the washing zone by applying water uniformly thereto while having no cake-disturbing impact including a water pipe adapted to be located in said drum and to extend longitudinally thereof, an air pipe parallel to the water pipe and above the same, brackets adjustably mounted on said pipes, each bracket on the air pipe corresponding to a bracket on the water pipe, an atomizer unit adjustably mounted on each bracket and including an air nozzle and a water nozzle, cross take-offs in each pipe in correspondence with the brackets thereon, and two flexible tubes extending from each take-off and connected one with the corresponding nozzle of an atomizer unit on one of said pipes and the other with the corresponding nozzle of an atomizer on the other pipe.

In testimony whereof I affix my signature.

FRANCIS B. COLEY.